Figure 1:
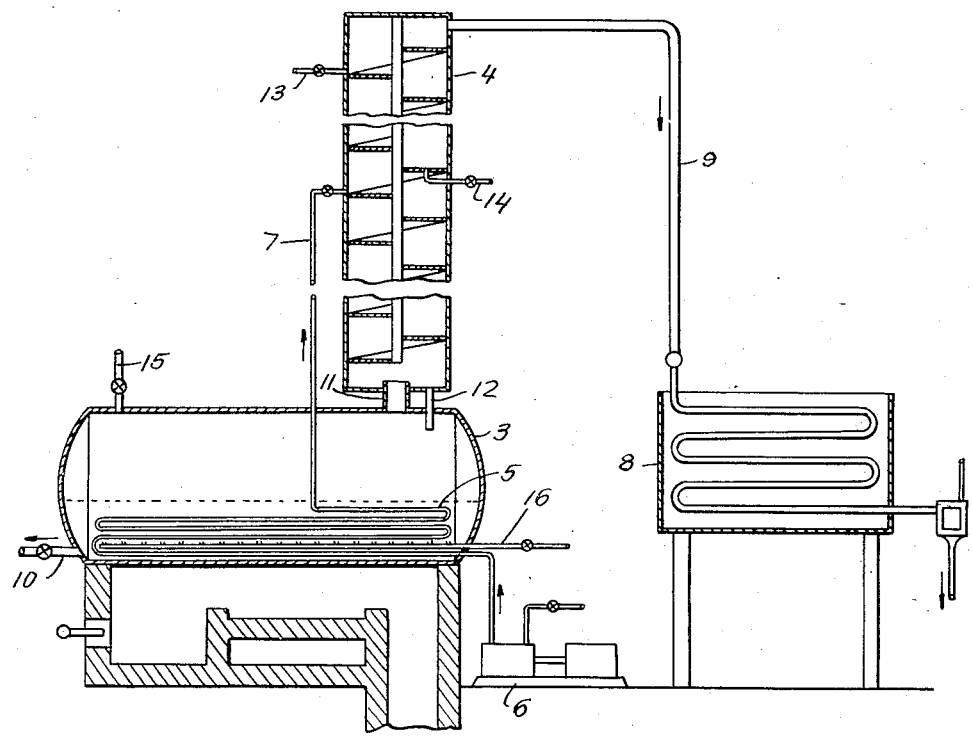

July 30, 1935.  W. MENDIUS  2,009,557

ART OF FRACTIONATING HYDROCARBONS

Filed Nov. 30, 1931

INVENTOR
William Mendius
BY
Pennie, Davis, Marvin + Edmonds
ATTORNEYS

Patented July 30, 1935

2,009,557

UNITED STATES PATENT OFFICE 2,009,557

ART OF FRACTIONATING HYDROCARBONS

William Mendius, Chicago, Ill., assignor to Sinclair Refining Company, New York, N. Y., a corporation of Maine Application November 30, 1931, Serial No. 577,993

2 Claims. (Cl. 196—104)

This invention relates to improvements in fire-heated apparatus for distilling petroleum oils with a minimum of decomposition. One of the most widely used conventional types of apparatus for distilling oil comprises a fire-heated shell still, a fractionating tower and a condenser, with connections for conveying vapors from the still to the fractionating tower, for supplying oil to be distilled to the fractionating tower, for conveying admixed condensate and unvaporized oil supplied to the fractionating tower to the still, for conveying vapors from the fractionating tower to the condenser and for discharging residual oil from the still. This invention relates particularly to improvements in this type of apparatus.

The improved apparatus of the present invention comprises a fire-heated shell still and a fractionating tower, a heat exchanging coil arranged within the shell still and below the normal liquid level therein, means for supplying oil to be distilled to one end of this coil, connections for discharging oil from the other end of this coil to the tower at an intermediate point, connections for conveying oil from the lower end of the tower to the still, connections for discharging vaporized oil from the upper end of the tower to a condenser, and connections for discharging residual oil from the still.

By providing and so arranging the heat exchanging coil through which the oil to be distilled is passed before it is introduced into the fractionating tower, this oil is brought to a temperature approaching that of the body of oil in the still, in operation, prior to introduction into the tower in a particularly advantageous manner. A part of the burden of vaporization is thus shifted from the still to the tower; that is, more vaporization is effected in the tower and less vaporization is effected in the still. This in turn enables the maintenance of a smaller body of oil in the still, in operation. The improved apparatus of the invention thus makes possible a reduction of the temperature to which the oil is heated in the still and a reduction of the average period of time the oil remains in the still. These decreases of time and temperature both tend to minimize decomposition of the oil undergoing distillation.

The invention will be further described in connection with the accompanying drawing which illustrates, diagrammatically and conventionally, one form of apparatus, and a modification of this form of apparatus, embodying the invention. It will be understood that this further and more detailed description of the invention is not limited in embodiment to the particular form of apparatus illustrated.

Figure 2:
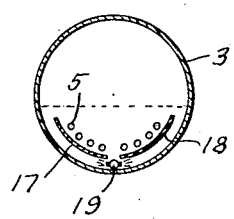

In the accompanying drawing:

Fig. 1 is an elevation in section with parts broken away of apparatus embodying the invention, and Fig. 2 is a view corresponding to a transverse section through the still of the apparatus illustrated in Fig. 1 of a modification.

Referring to Fig. 1, the apparatus illustrated comprises a fire-heated shell still 3, a fractionating tower 4, a heat exchanging coil 5, a pump 6 for supplying oil to the heat exchanging coil 5, a connection 7 for discharging oil from the heat exchanging coil 5 into the tower 4, a condenser 8, a connection 9 for discharging vaporized oil from the tower 4 to the condenser 8, and a connection 10 for discharging residual oil from the still 3, the tower 4 being connected to the still 3 by a vapor line 11 and a connection 12 for conveying oil from the tower 4 to the still 3.

The fractionating tower illustrated is of the type described in Letters Patent Number 1,683,151, granted to Sinclair Refining Company September 4, 1928, on an application of the late John E. Bell. Any of the conventional forms of fractionating towers may be used in the combined apparatus of the invention in place of the particular fractionating tower illustrated in Fig. 1. The so called "bubble tower" may, for example, be used with advantage.

In the apparatus illustrated, the fractionating tower 4 may be controlled by the regulated introduction, through connection 13, of an appropriate refluxing medium, a part of the distillate discharged from the condenser 8 or a fraction of corresponding character, for example. One or more intermediate fractions may be discharged from the tower 4 above the point at which the oil discharged from the heat exchanging coil 5 is introduced into the tower, through connection 14 or corresponding connections for example. Connection 15 is provided for initially charging the still.

Steam may be introduced into the body of oil in the still 3, in operation, through a spider connected to connection 16. To promote heat transfer between the body of oil in the still, in operation, and the oil flowing through the heat exchanging coil as well as the heating gases externally contacting with the still, baffles may be arranged within the still to promote circulation of the body of oil in the still over the heat exchanging coil and steam jets may be arranged further to promote this circulation, as illustrated in Fig. 2. The same reference characters are used in Fig. 1 and in Fig. 2 to designate the same or corresponding parts. Baffles 17 and 18, spaced along the lower central portion of the still, and arranged below the normal liquid level, may be provided to promote direct circulation of the body of oil in the still over those parts of the shell externally contacting with heating gases and over the heat exchanging coil 5, and a connection 19 may be arranged with jets positioned further to promote this circulation, as illustrated.

In operation, an initial body of oil somewhat smaller in volume at the operating temperature than the normal operating body is charged to the still through connection 15. The still is then fired and brought on stream in the conventional manner except that the supply of oil to be distilled through the heat exchanging coil 5 and thence into the tower 4 through connection 7 is begun as vapors begin to rise through the tower 4. Oil is initially supplied at a subnormal rate to the heat exchanging coil 5, but as the tower 4 reaches operating conditions and the introduction of a reflux medium through connection 13 is begun, this rate is gradually increased to the operating rate. The discharge of residual oil through connection 10 is begun when the still reaches operating conditions, or somewhat before this time if necessary, to maintain an appropriate liquid level in the still.

The oil to be distilled supplied through the heat exchanging coil 5 is heated in that coil to a temperature approaching that of the body of oil in the still before it is introduced into the fractionating tower 4. As the heat transferring surface of the heat exchanging coil 5 is increased and the circulation of the body of oil in the still 3 is augmented, the temperature to which the oil passing through the heat exchanging coil 5 is heated approaches that of the body of oil in the still more and more closely. As the thus heated oil is introduced into the fractionating tower 4, a larger part of it is vaporized and a smaller part of it remains unvaporized to pass from the fractionating tower to the still. This not only directly reduces the burden of vaporization on the still 3 but also reduces this burden in that it reduces the rate at which heat must be supplied in vapors from the still to the fractionating tower. Reduction of the burden of vaporization on the still makes possible a reduction of the temperature of the body of oil maintained in the still and assists in making possible a reduction of the volume of the body of oil maintained in the still. This reduction of temperature assists in minimizing decomposition and reduction of the volume of the body of oil maintained in the still reduces the average period of time the oil is in the still which also, in reducing the time at which the oil is at elevated temperature, further reduces decomposition.

I claim:

1. In combination in fire-heated apparatus for distilling oil with a minimum of decomposition, a fire-heated shell still, a fractionating tower and a vapor connection between said still and said tower, a heat exchanging coil arranged within the shell still and below the normal liquid level therein, means for supplying oil to be distilled to one end of said coil, connections for discharging oil from the other end of said coil into the tower at an intermediate point, connections for conveying oil from the lower end of the tower to the still, connections for discharging vaporized oil from the upper end of the tower to a condenser, and connections for discharging residual oil from the still.

2. In combination in fire-heated apparatus for distilling oil with a minimum of decomposition, a fire-heated shell still, a fractionating tower and a vapor connection between said still and said tower, a heat exchanging coil arranged within the shell still and below the normal liquid level therein, means for supplying oil to be distilled to one end of said coil, connections for discharging oil from the other end of said coil into the tower at an intermediate point, means for introducing a refluxing medium into the tower at a higher point, connections for conveying oil from the lower end of the tower to the still, connections for discharging vaporized oil from the upper end of the tower to a condenser, and connections for discharging residual oil from the still.

WILLIAM MENDIUS.